(12) United States Patent
Face et al.

(10) Patent No.: US 9,926,701 B2
(45) Date of Patent: Mar. 27, 2018

(54) METHOD OF FABRICATING A CONCRETE SLAB SYSTEM

(71) Applicant: GCP Applied Technologies Inc., Cambridge, MA (US)

(72) Inventors: S. Allen Face, Sleepy Hollow, IL (US); Gregory M Scurto, Naples, FL (US)

(73) Assignee: GCP APPLIED TECHNOLOGIES INC., Cambridge, MA (US)

( * ) Notice: Subject to any disclaimer, the term of this patent is extended or adjusted under 35 U.S.C. 154(b) by 0 days.

(21) Appl. No.: 15/462,081

(22) Filed: Mar. 17, 2017

(65) Prior Publication Data

US 2017/0292267 A1    Oct. 12, 2017

Related U.S. Application Data

(60) Provisional application No. 62/319,568, filed on Apr. 7, 2016.

(51) Int. Cl.
*E04B 5/32*    (2006.01)

(52) U.S. Cl.
CPC ..................... *E04B 5/32* (2013.01)

(58) Field of Classification Search
CPC ... E04B 5/32; E04B 5/326; E04B 5/38; E04B 5/40; E04B 5/43; E04B 5/44; E04B 1/04; E04B 1/14; E04B 1/16; E04B 1/34823; E04B 1/7608; E04B 2001/8466; B29C 2045/179; B29C 66/74; B29C 66/7463; B29C 43/146; B29C 39/021
See application file for complete search history.

(56) References Cited

U.S. PATENT DOCUMENTS

| | | | |
|---|---|---|---|
| 7,968,178 B1 | 6/2011 | Scurto et al. | |
| 2002/0139082 A1* | 10/2002 | DeFord | E04C 2/04 52/783.1 |

* cited by examiner

*Primary Examiner* — Stella Yi
(74) *Attorney, Agent, or Firm* — Peter J. Van Bergen

(57) ABSTRACT

A method of fabricating a concrete slab system places bed of a first concrete on a base. The bed has a top surface, a bottom surface, and edge surfaces. The bed is exposed to a drying environment such that the top surface develops shrinkage cracks and portions of the bed separate from the base. A force applied to the top surface induces non-shrinkage cracks in the bed that extend to the bed's bottom surface. Non-concrete material is placed on the bed's top surface and on each of its edge surfaces. The non-concrete material and bed are covered with a second concrete having stretchable fibers mixed therein.

24 Claims, 8 Drawing Sheets

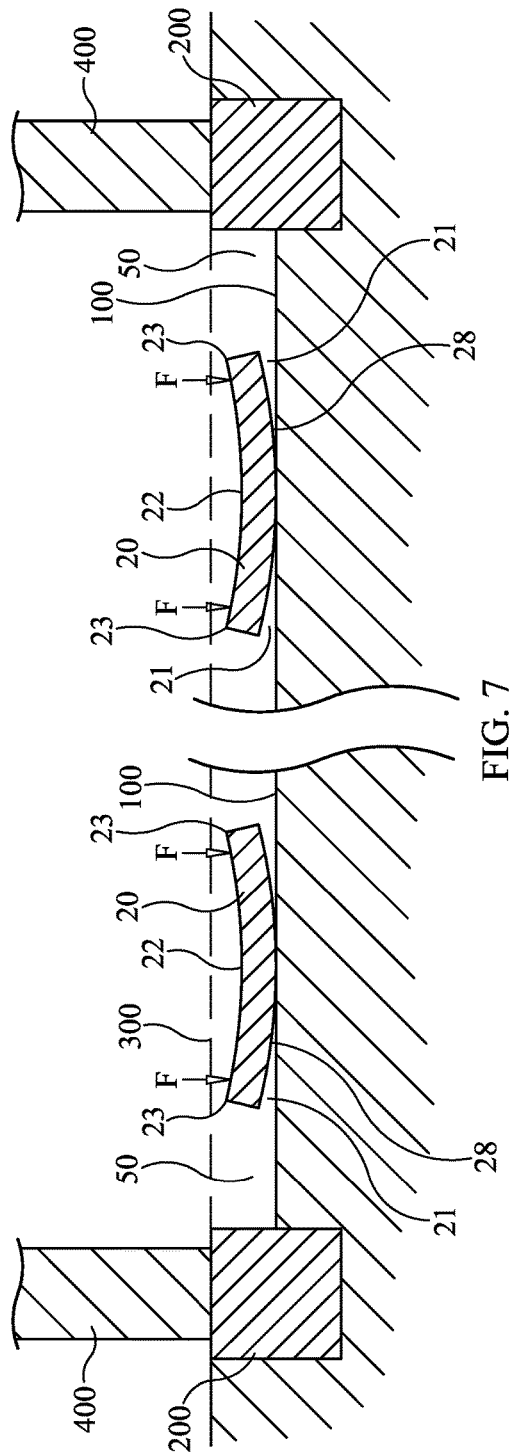
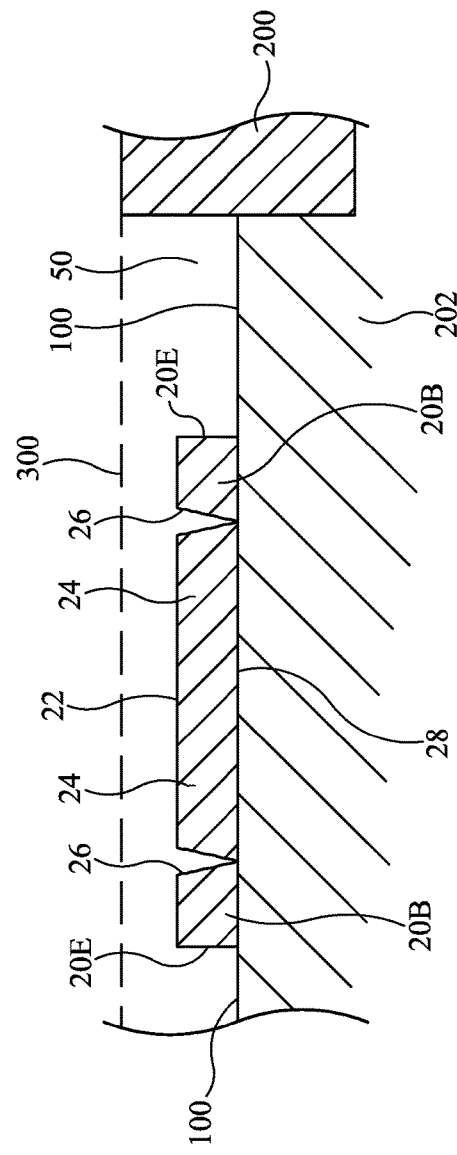
FIG. 7
FIG. 8

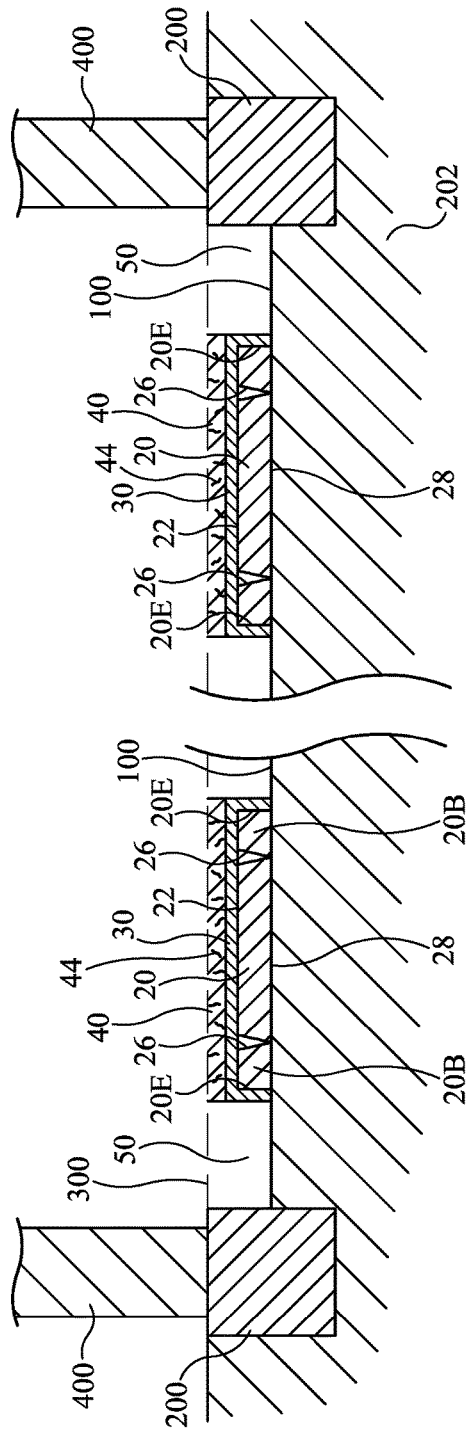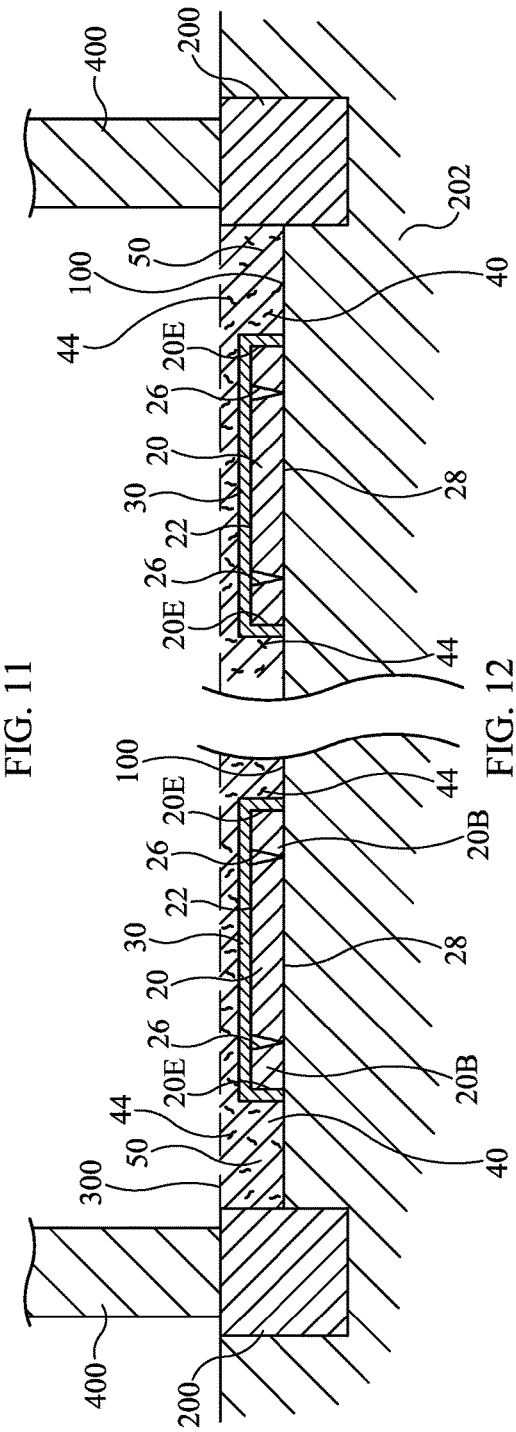

METHOD OF FABRICATING A CONCRETE SLAB SYSTEM

Pursuant to 35 U.S.C. § 119, the benefit of priority from provisional application 62/319,568, with a filing date of Apr. 7, 2016, is claimed for this non-provisional application.

CROSS-REFERENCE TO RELATED PATENT APPLICATIONS

This patent application is co-pending with one related patent application entitled "CONCRETE SLAB SYSTEM", filed by the same inventors and owned by the same assignee as this patent application.

FIELD OF THE INVENTION

The invention relates generally to concrete slab fabrication, and more particularly to a method for fabricating a high-quality-finish concrete slab system that also provides functionality during a building's construction phase.

BACKGROUND OF THE INVENTION

A building's concrete slab/floor (hereinafter referred to as "slab") is often the showpiece of a building and must be smooth and flat in order to safely support foot and vehicular traffic during the building's life. However, a building's concrete slab is usually poured and finished early on in a building's construction thereby subjecting the slab to a barrage of construction processes that damage the slab's finish physically and cosmetically. Such damages can be difficult or impossible to repair thereby leaving the finished building slab in a physically and/or cosmetically damaged state when the building is brand new.

A common construction process that subjects a concrete slab to substantial abuse is known as tilt-up or tilt-wall construction. Tilt-up or tilt-wall construction is a well-known approach to the construction of concrete buildings and structures. In general, tilt-wall construction involves the horizontal fabrication of concrete wall panels on a horizontal concrete casting bed, followed by the raising or tilting of the concrete wall panels into vertical orientations on top of a footing. For most tilt-wall construction, some (or substantially all) of a building's interior concrete slab is poured and finished to its finished grade prior to the casting of the wall panels with portions of the slab near the building's perimeter serving as the casting bed regions for the fabrication of concrete wall panels. The portion of the slab serving as the casting bed regions is subjected to heavy construction traffic and abuse during tilt-wall fabrication and erection operations. As a result, it is difficult or impossible to provide a high-quality-finish concrete slab that was previously used as a tilt-wall construction casting bed.

SUMMARY OF THE INVENTION

Accordingly, it is an object of the present invention to provide a method for fabricating a high-quality-finish concrete slab system.

Another object of the present invention is to provide a high-quality-finish concrete slab system that also provides functionality and advantages during a building's construction phase without jeopardizing the slab's ultimate high-quality finish.

Still another object of the present invention is to provide a method of constructing a concrete slab system that supports tilt-wall construction and ultimate slab applications.

Other objects and advantages of the present invention will become more obvious hereinafter in the specification and drawings.

In accordance with the present invention, a method of fabricating a concrete slab system includes the step of placing a bed of a first concrete on a base. The bed has a top surface, a bottom surface, and edge surfaces. The bed is exposed to a drying environment wherein the top surface develops shrinkage cracks and portions of the bed separate from the base. A force is applied to the top surface at the portions of the bed separated from the base to induce non-shrinkage cracks in the bed. The non-shrinkage cracks extend to the bed's bottom surface. Non-concrete material is placed on the bed's top surface and on each of its edge surfaces. The non-concrete material and bed are covered with a second concrete having stretchable fibers mixed therein.

BRIEF DESCRIPTION OF THE DRAWINGS

Other objects, features and advantages of the present invention will become apparent upon reference to the following description of the preferred embodiments and to the drawings, wherein corresponding reference characters indicate corresponding parts throughout the several views of the drawings and wherein:

FIG. 7 is a schematic cross-sectional view of a below-grade bed that has dried and cured to thereby experience shrinkage cracks and curl;

FIG. 8 is an enlarged cross-sectional view of a portion of the below-grade bed with shrinkage cracks and induced cracks in accordance with the present invention;

FIG. 11 is a schematic cross-sectional view of the below-grade bed, non-concrete material, and concrete covering deposited thereon in accordance with an embodiment of the present invention; and FIG. 12 is a schematic cross-sectional view of a completed concrete slab system in accordance with an embodiment of the present invention.

DETAILED DESCRIPTION OF THE INVENTION

Figure 1:
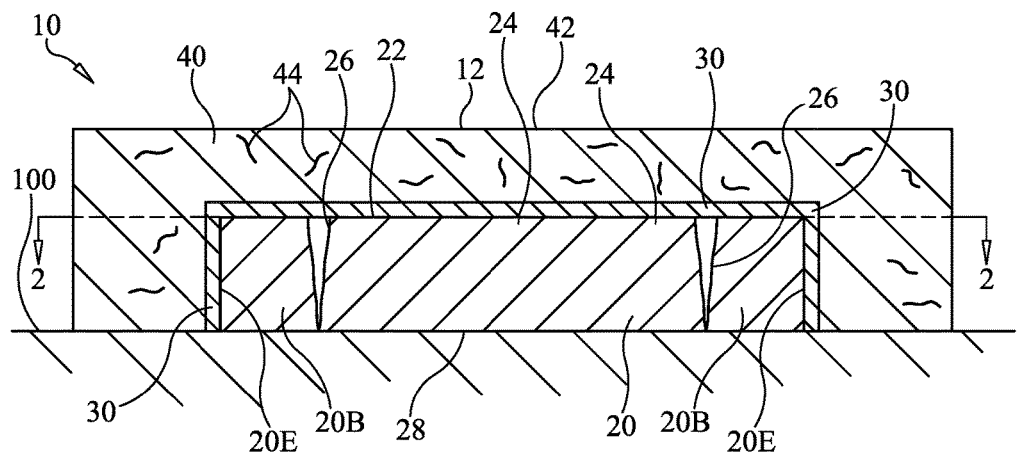
FIG. 1 is a side sectional view of a concrete slab system in accordance with an embodiment of the present invention.
Figure 2:
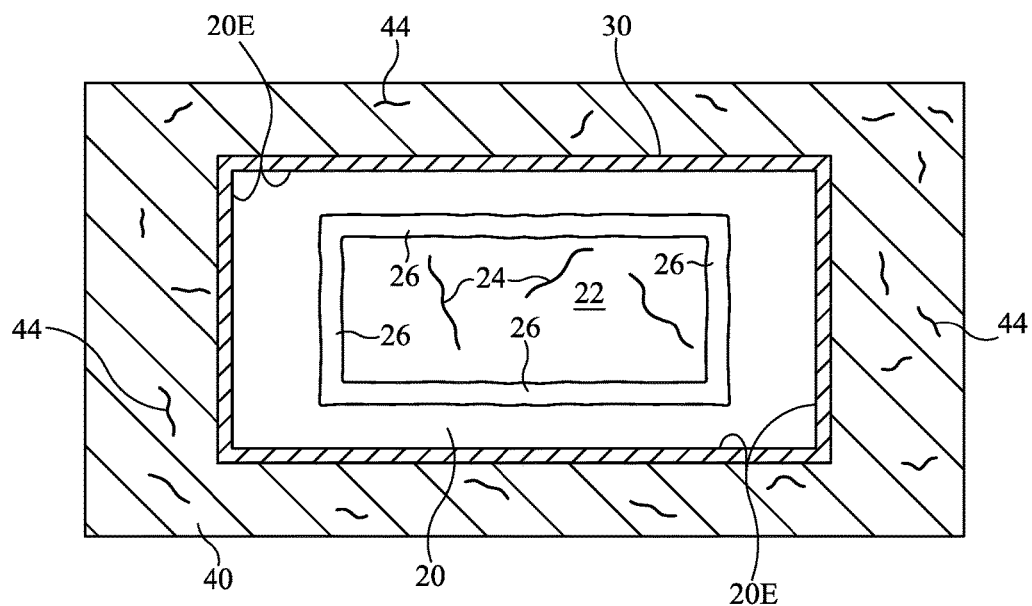
FIG. 2 is a sectional plan view of the concrete slab system taken along line 2-2 in FIG. 1.
Figure 3:
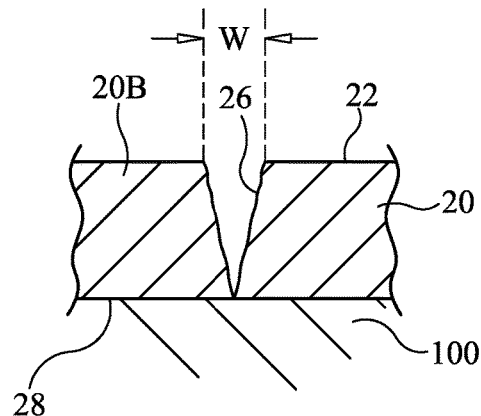
FIG. 3 is an isolated and enlarged view of a portion of the concrete slab system's bed taken along line 3-3 in FIG. 2.

Referring now to the drawings, simultaneous reference will be made to FIGS. 1-3 where FIGS. 1-2 illustrate a concrete slab system 10 in accordance with an embodiment of the present invention. It is to be understood that the elements of system 10 are drawn to illustrate the novel features of system 10 and are not drawn to scale. In general and as will be explained further herein, a portion of system 10 provides functionality during a building's construction phase, while the entirety of system 10 is the building's concrete slab system that has a high-quality finish defined by a smooth, flat, and virtually blemish-free top surface.

Concrete slab system 10 includes a concrete bed 20, a non-concrete material 30, and a concrete covering 40. The top or exposed portion of concrete covering 40 defines the top/finished surface 12 of system 10 whereas the bottom portions of concrete covering 40 are in contact with non-concrete material 30 and can define a portion of the bottom 14 of system 10.

Concrete bed 20 can be made from a variety of types of concrete materials or mixes. One of the great advantages of the present invention is that bed 20 can be made using concrete materials that decrease a project's cost, while also providing functionality during a building's construction phase and a stable support for the remaining elements of system 10. Some exemplary concrete materials/mixes that can be used for bed 20 include, but are not limited to, conventional region-specific concrete mixes, high fly ash content concrete mixes, high "ground granulated blast furnace slag" (GGBFS) content concrete mixes, Portland and non-Portland cement concrete mixes, recycled concrete mixes, etc. Each of the above-noted concrete mixes can be a fiber-free or non-fibrous concrete mix thereby making bed 20 a cost-effective element of system 10. However, it is to be understood that bed 20 could include additives such as liquid additives and/or fibers without departing from the scope of the present invention.

Following a wet placement of bed 20 on a base 100 (e.g., the ground, bed of stones, etc.), bed 20 begins to dry and cure. As bed dries/cures, any of the above-described concrete mixes will undergo shrinkage to thereby naturally develop shrinkage cracks 24 (e.g., hairline cracks that are generally visible but have no measurable width) originating in the top surface 22 of bed 20. That is, shrinkage cracks 24 occur spontaneously as a consequence of the natural volume reduction of bed 20 without any human and/or machine interaction. Shrinkage cracks 24 generally extend minimally or just partially into the thickness of bed 20 from top surface 22. In addition to the development of naturally-occurring shrinkage cracks 24 during the natural shrinking of bed 20, bed 20 will experience naturally-occurring curl at any edges thereof as the concrete mix dries and cures. As will be explained further later herein, concrete curl is defined by the raising of concrete's edge regions away from the surface of the base on which concrete is placed such that a gap forms between the bottom of any curled concrete and the base on which it has been placed. Since bed 20 is to be placed early on in a building's construction, bed 20 will have a sufficient amount of time to experience the natural occurrence of both shrinkage cracking and curl at its edge regions.

In accordance with the present invention and as will be explained further below, concrete bed 20 is purposefully processed to generate induced cracks 26 (i.e., via purposeful human and/or machine interaction with top surface 22 as opposed to the above-described naturally-occurring shrinkage cracks 24) therein prior to completing system 10 with non-concrete material 30 and concrete covering 40. More specifically and with additional reference to the isolated portion of bed 20 shown in FIG. 3, each non-shrinkage-based induced crack 26 is V-shaped in cross-section and extends to the bottom surface 28 of bed 20. Each induced crack 26 is clearly visible at top surface 22 and has a width "W" at the bed's top surface 22 that is greater than the width of any shrinkage crack 24 at top surface 22. As a result of induced cracks 26, bed 20 breaks at induced cracks 26 to define broken regions 20B of bed 20 with the bottoms of broken regions 20B adjacent to each induced crack 26 being placed in contact with base 100 as illustrated in FIG. 3. Induced cracks 26 will be located all around a perimeter region of bed 20 as illustrated in FIG. 2. Moreover and in general, induced cracks 26 will be in bed 20 at any edge region or location where bed 20 exhibited curl as bed 20 dried and cured.

Figure 4:
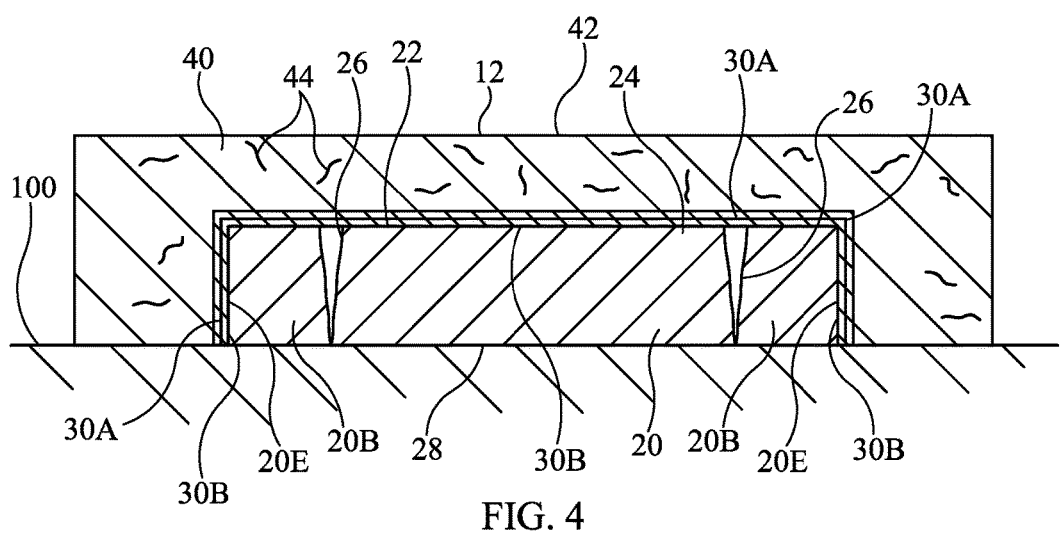
FIG. 4 is a side sectional view of a concrete slab system in accordance with another embodiment of the present invention.

Non-concrete material 30 is disposed on top surface 22 of bed 20 as well as any exposed edge surfaces 20E of bed 20. Material 30 provides both friction reduction and bond prevention between bed 20 and concrete covering 40. Material 30 can be a single layer as shown in FIG. 1 or multiple layers (e.g., layers 30A and 30B as shown in FIG. 4) of a non-concrete material such as, but not limited to, sheet(s) of plastic (e.g., polymers such as polyethylene), layer(s) of a spray-on non-concrete material (e.g., TEFLON or other lubricant), and combinations thereof. While the particular thickness of material 30 is not a limitation of the present invention, typical thicknesses range from approximately 1 mil to approximately 20 mils.

Covering bed 20 and non-concrete material 30 is concrete covering 40 whose top surface 42 defines the ultimate finished top surface 12 of concrete slab system 10. In general, concrete covering 40 is a concrete mix with stretchable fibers 44 mixed therein. The concrete mix can include a variety of concrete mixes such as those described above. Stretchable fibers 44 can include polymer fibers, metal fibers, or combinations thereof. The lengths of the fibers and the amount of stretch associated therewith can be selected to satisfy the needs of a particular application. The amount of stretchable fibers 44 mixed in concrete covering 40 is generally expressed as a weight per cubic yard of concrete covering 40. Suitable weight amounts of stretchable fibers 44 range from 3-65 pounds per cubic yard of concrete covering 40. Lower weight amounts are generally associated with polymer fibers while higher weight amounts are generally associated with metal fibers.

Concrete covering 40 includes stretchable fibers 44 to decrease the elastic modulus of concrete covering 40 when it hardens. If using only polymer fibers, approximately 3-9 pounds of stretchable fibers 44 will typically be mixed into each cubic yard of the concrete so that it will be flexible enough after setting to eliminate curl of concrete slab system 10. Such polymer fibers could be polymer macrofibers that range in length from approximately 0.5 inches to approximately 2.5 inches. The fibers could be all the same length or different lengths without departing from the scope of the present invention.

The above-described bed 20 can define or substantially define a building's floor footprint. However, the above-described bed 20 could also be a smaller portion of the building's floor footprint as is sometimes the case in tilt-wall construction. In either case, the method used to fabricate concrete slab system 10 is essentially the same as will be described herein below.

The present invention includes a novel concrete slab system construction method that produces the resulting and novel concrete slab system described above. By way of an illustrative example, the fabrication method will be described as part of one type of a tilt-wall construction methodology. However, it is to be understood that the present invention is not limited to use in tilt-wall construction as the present invention's concrete slab system can be fabricated during any building construction methodology. The present invention is particularly well-suited to the construction of a high-quality-finish and curl-free concrete slab system.

Figure 5A:
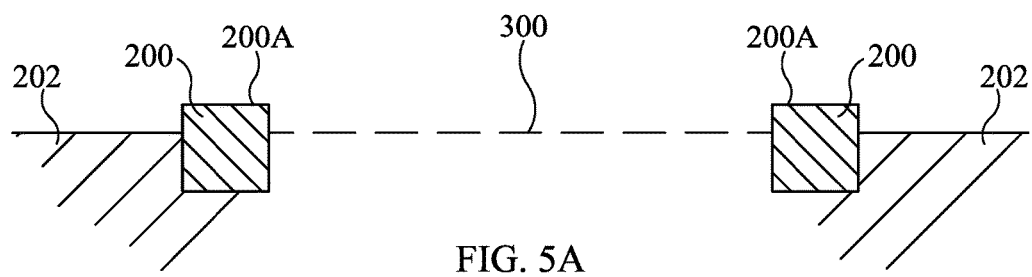
FIG. 5A is a schematic cross-sectional view of a building site with a structure's footing above the structure's proposed finished floor grade level.
Figure 5B:
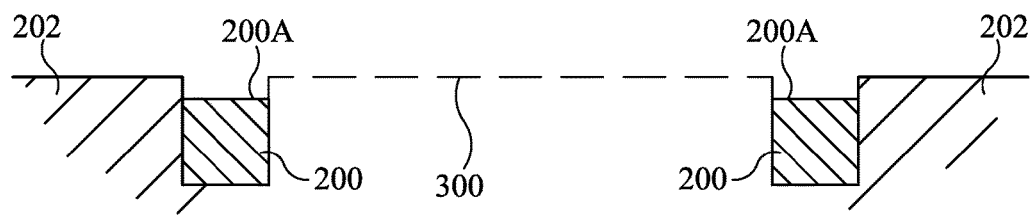
FIG. 5B is a schematic cross-sectional view of a building site with a structure's footing below the structure's proposed finished floor grade level.
Figure 5C:
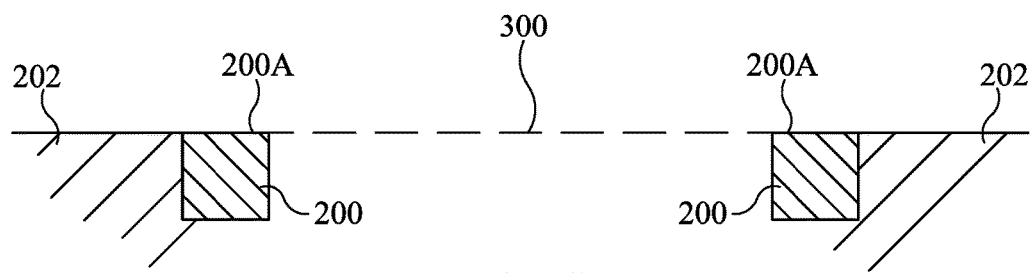
FIG. 5C is a schematic cross-sectional view of a building site with a structure's footing at the structure's proposed finished floor grade level.

Prior to describing the fabrication method, reference is made to FIGS. 5A-5C where exemplary footings are illustrated and are referenced by numeral 200. As is known in the art, footings 200 provide the in-ground support for a structure's walls (e.g., concrete wall panels erected using tilt-wall construction techniques). The particular materials used for footings 200 as well as their particular construction are not part of the present invention or a limitation of the present invention. In general, footings 200 define the outer perimeter of a structure.

Each footing 200 extends some depth into a surrounding ground environment 202 of the building site with the top supporting surface 200A of each footing 200 being above the structure's proposed finish floor grade level 300 (FIG. 5A), below the structure's proposed finish floor grade level 300 (FIG. 5B), or at the structure's proposed finish floor grade level 300 (FIG. 5C) depending on the needs of the particular construction project. The region between the illustrated footings 200 will become the interior of a structure to be built using footings 200. It is to be understood that additional footings (not shown) can be formed between the illustrated footings 200 to provide support for interior walls, columns, etc.

Figure 6A:
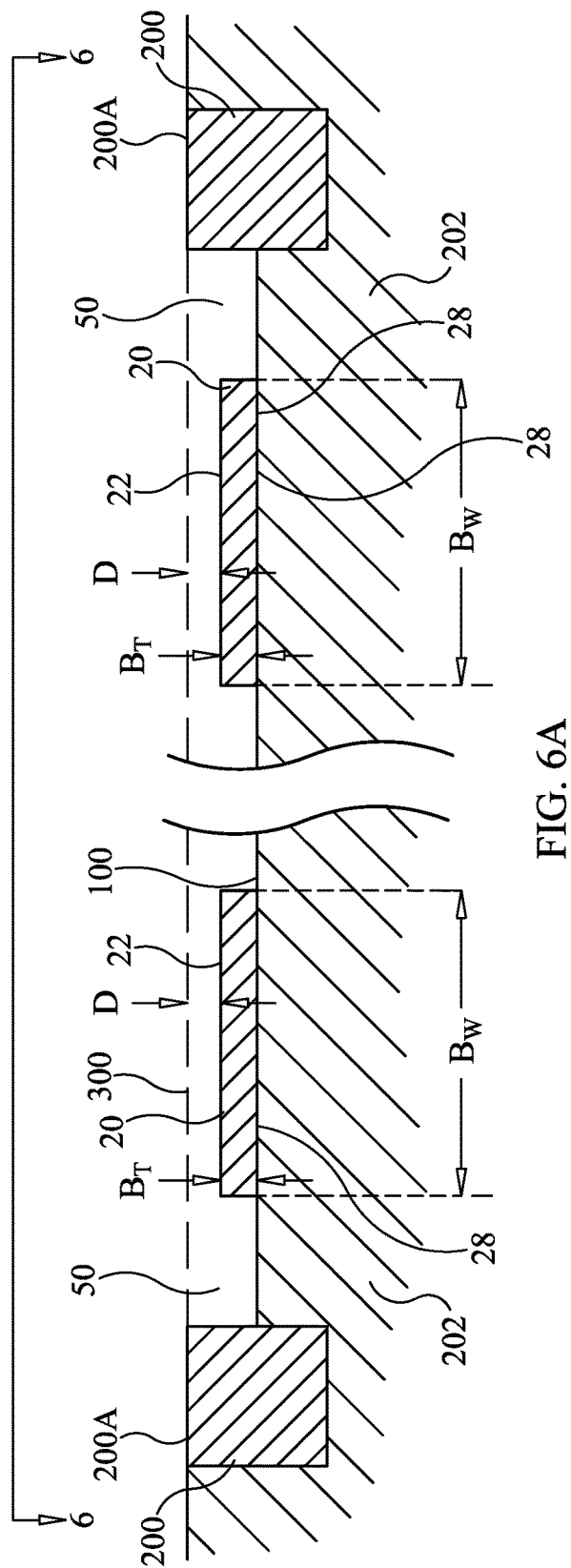
FIG. 6A is a schematic cross-sectional view of a below-grade bed in accordance with an embodiment of the present invention.

When a concrete slab of the present invention is to be constructed, the ground environment 202 between footings 200 needs to be excavated to a level below that of what will be finished concrete floor slab. For example and with reference to FIG. 6A, ground environment 202 is excavated or dug out below a level (referenced by dashed line 300) that defines what will become the top surface of a finished concrete floor slab system for the particular project. The base of the excavated region defines the above-described base 100 for the concrete slab system of the present invention.

Figure 6B:
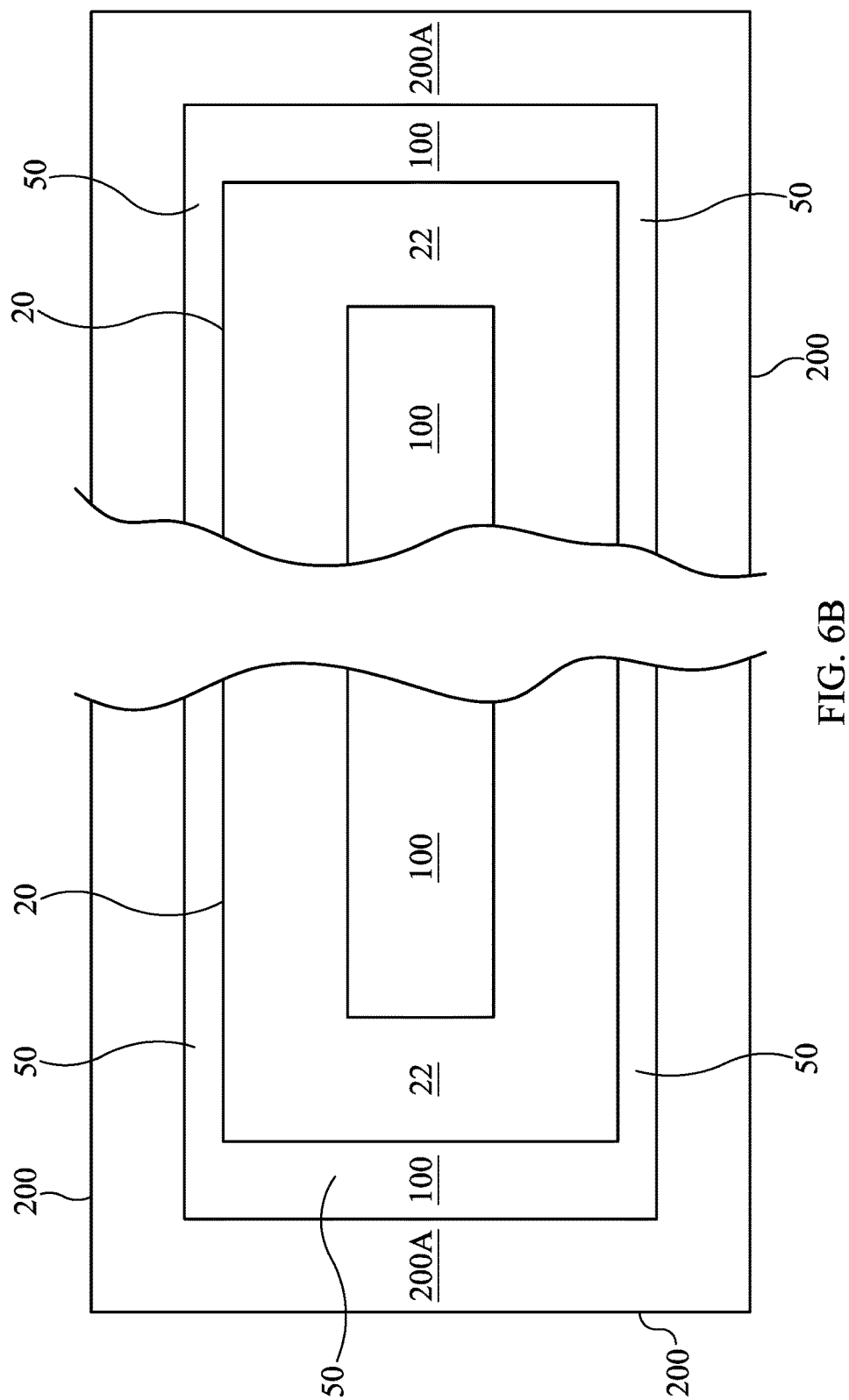
FIG. 6B is a plan view of the footing and the below-grade bed taken along line 6-6 in FIG. 6A.

In accordance with the present invention, a bed 20 of concrete in its plastic state is deposited on base 100 with the top surface 22 of bed 20 being below the level 300 of the top surface of the finished concrete slab system. In general, bed 20 is of a width "$B_W$" and thickness "$B_T$" to support the construction of concrete tilt-walls thereon. Bed 20 can be formed just inside the entire periphery of the structure to be built on footings 200 as illustrated in FIG. 6B. Bed 20 can be offset from footings 200 by a gap 50 sufficient to support the raising of tilt-walls from bed 20 as is known in the art of tilt-wall construction. Bed 20 can define a frame surrounding a region of base 100 that remains exposed as illustrated in the example shown in FIGS. 6A and 6B. However, it is to be understood that bed 20 can also be a contiguous bed that substantially covers base 100 except for gap 50 as needed for tilt-wall construction. In either case, the distance "D" between top surface 22 and finished slab level 300 will be filled with the above-described novel layered structure that includes the above-described non-concrete material 30 and concrete covering 40 to complete the finished concrete slab system as will be described further herein. For the above-described concrete covering 40, the distance D is generally on the order of approximately 2.5 to approximately 4 inches.

Concrete tilt-wall panels (not shown in FIGS. 6A and 6B) are fabricated on top surface 22 of bed 20 and raised onto footings 200 as is known in the art. It is to be understood that the fabrication, tilting/raising, and ultimate anchoring of such tilt-wall panels is not a limitation of the present invention. Accordingly, and with reference to FIG. 7, concrete tilt-wall panels 400 are shown positioned on footings 200. For clarity of illustration, no additional supports, anchoring, etc., are shown.

Bed 20 can be made using any of the various concrete mixes described above. As also mentioned above, these types of concrete mixes tend to exhibit curl when they dry/cure as illustrated in FIG. 7. Since bed 20 will typically have had a substantial amount of time to dry/cure during the tilt-wall construction process, FIG. 7 depicts bed 20 as it will appear after a typical tilt-wall construction process is complete. More specifically, a dried/cured bed 20 will naturally develop shrinkage cracks as described above and will naturally tend to be pulled up and away from base 100 (i.e., referred to a "curl" in the art) at least around the periphery as well as any edge regions of bed 20. As a result of such curling, air spaces or gaps 21 are defined between portions of the bottom surface 28 of bed 20 and base 100, and raised edges 23 are defined at top surface 22 about the periphery of bed 20 as well as any other edge regions of bed 20. Gaps 21 and/or raised edges 23 can be the source of crack formation in any concrete topping product applied to top surface 22.

Once tilt-wall panels 400 are vertically erected as shown, bed 20 no longer needs to function for purposes of tilt-wall construction. At this point or any point thereafter in the building's construction, bed 20 is ready to be processed for purposes of becoming part of the finished concrete slab system whose top surface will be coincident with finished slab level 300. An advantage of the present invention's fabrication process and resulting concrete slab system is that the final processing steps used to create the completed concrete slab system can occur as a final building construction process thereby preventing construction abuse of the high-quality-finish concrete slab system.

As a first step in the slab system completion process, gaps 21 and/or raised edges 23 (illustrated in FIG. 7) must be eliminated. To do this, bed 20 is subjected to a purposefully-applied and directed force "F" impinging on top surface 22 at least along the perimeter regions of bed 20 and any other area where curl is exhibited or suspected. The application of force F causes the creation of induced cracks 26 and broken regions 20B as described above and illustrated in FIG. 8. The application of force F to bed 20 can be carried out by human and/or machine interaction with top surface 22 of bed 20 to include one or more of manual means, mechanized means such as driving a piece of heavy road construction equipment (e.g., a roller/compactor) on top surface 22, or using any other suitable force application technique(s) that purposefully creates non-shrinkage-based induced cracks 26 and broken regions 20B thereby eliminating gaps 21 under bed 20 as well as raised edges 23 at top surface 22.

Figure 9:
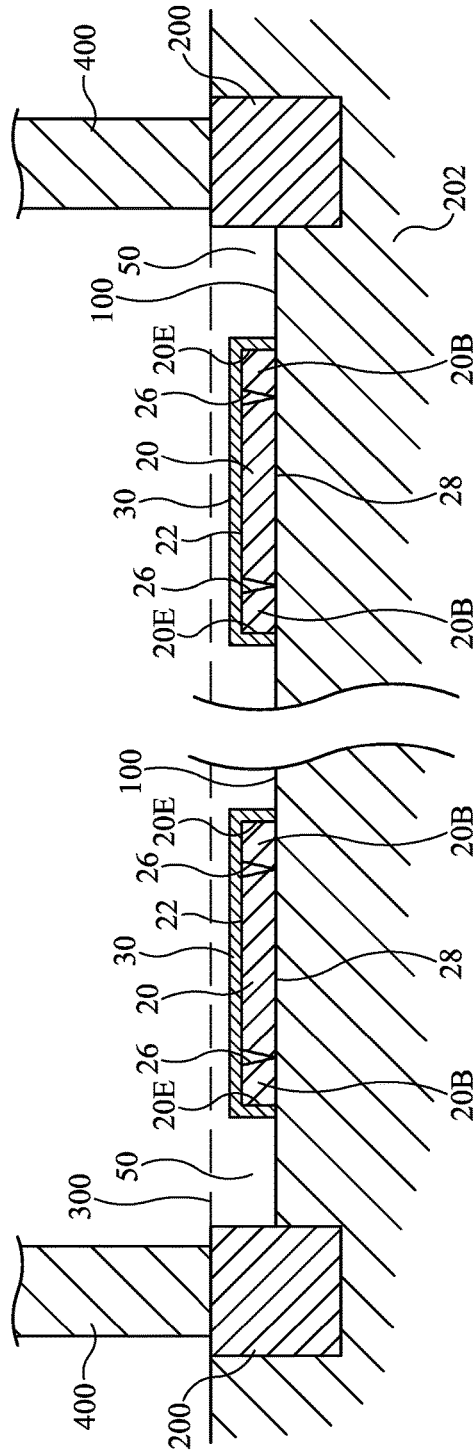
FIG. 9 is a schematic cross-sectional view of the below-grade bed covered with a single-layer of a non-concrete material in accordance with an embodiment of the present invention.
Figure 10:
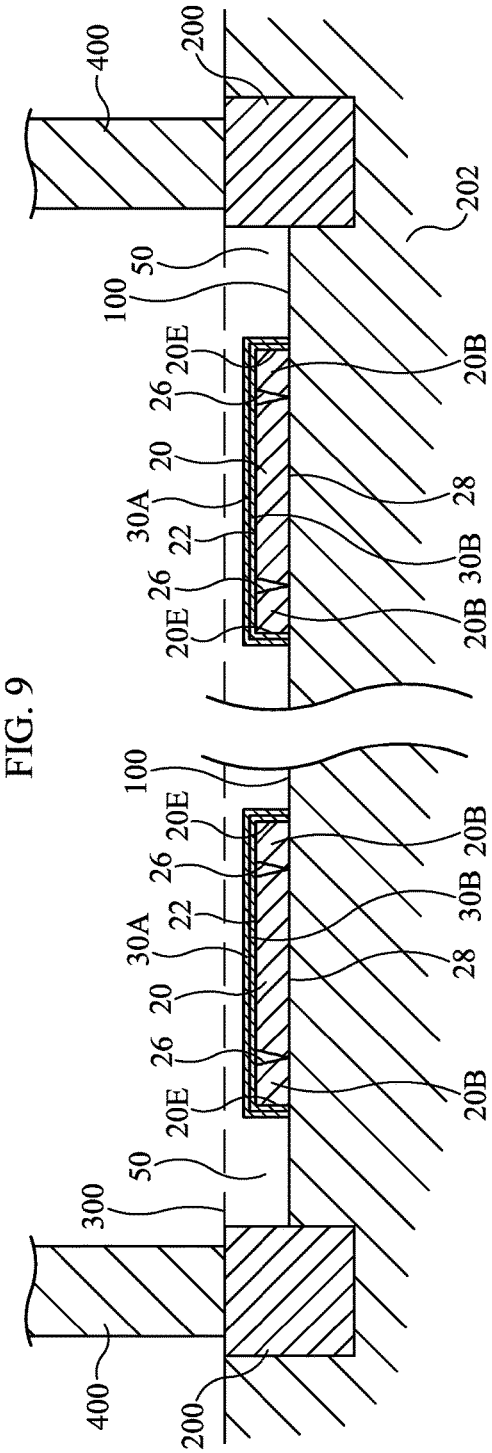
FIG. 10 is a schematic cross-sectional view of the below-grade bed covered with multi-layers of a non-concrete material in accordance with another embodiment of the present invention.

Referring additionally now to FIG. 9, the next step in the construction method of the present invention is the placement of non-concrete material 30 on top surface 22 and on all edge surfaces 20E of bed 20. Non-concrete material 30 is any sheet(s) and/or coating(s) having the attributes described previously herein. For example, material 30 can be a sheet or sheets of polymer material (e.g., polyethylene) whose thickness can generally range from approximately 1 mil to approximately 20 mils. Material 30 can be a single layer as shown in FIG. 9, but could also be realized using multiple layers such as layers 30A and 30B as shown in FIG. 10. Additional friction reduction is achieved by a multi-layer material 30 since layers 30A/30B will readily slide relative to one another.

After material 30 is in place, concrete covering 40 in a plastic state thereof is deposited on bed 20 and material 30, as well as the regions within and outside of the confines of bed 20, in order to define a complete concrete slab system whose top surface is coincident with finished slab level 300. The placing of concrete covering 40 can be accomplished using one or more wet concrete placements as would be understood in the art. For example, for the frame-type of bed 20 in the illustrated example, forms (not shown) could be placed around the inner and outer perimeters of bed 20, and concrete covering 40 could then be poured/deposited between the forms and on top of non-concrete material 30 up to finished slab level 300 as illustrated in FIG. 11. Then, additional amounts of concrete covering 40 can be poured/deposited in gap 50 and within the region bounded by bed 20 up to finished slab level 300 as illustrated in FIG. 12.

The advantages of the present invention are numerous. The finished top surface of the concrete slab system need never exposed to the abuse of construction events such as tilt-wall construction. Further, the concrete slab system's topping can be poured/finished after a structure's roof is installed thereby minimizing or eliminating exposure of the slab system's finish surface to environmental abuse. The use of a curl-free concrete covering in combination with the friction-reducing non-concrete barrier on the flat, induced-crack bed ensures the curl-free attributes of the concrete covering will not be compromised.

Although the invention has been described relative to specific embodiments thereof, there are numerous variations and modifications that will be readily apparent to those skilled in the art in light of the above teachings. It is therefore to be understood that, within the scope of the appended claims, the invention may be practiced other than as specifically described.

What is claimed as new and desired to be secured by Letters Patent of the United States is:

1. A method of fabricating a concrete slab system, comprising the steps of:
    placing a bed of a first concrete on a base, said bed having a top surface, a bottom surface, and edge surfaces;
    exposing said bed to a drying environment wherein said top surface develops shrinkage cracks, and wherein portions of said bed separate from said base;
    applying a force to said top surface at said portions of said bed to induce non-shrinkage cracks in said bed wherein said non-shrinkage cracks extend to said bottom surface;
    placing non-concrete material on said top surface and on each of said edge surfaces; and
    covering said non-concrete material and said bed with a second concrete having stretchable fibers mixed therein, wherein said non-concrete material reduces friction between said bed and said second concrete and prevents bonding between said bed and said second concrete.

2. A method of fabricating a concrete slab system, comprising the steps of:
    placing a bed of a first concrete on a base, said bed having a top surface, a bottom surface, and edge surfaces;
    exposing said bed to a drying environment wherein said top surface develops shrinkage cracks, and wherein portions of said bed separate from said base;
    applying a force to said top surface at said portions of said bed to induce non-shrinkage cracks in said bed wherein said non-shrinkage cracks extend to said bottom surface;
    placing non-concrete material on said top surface and on each of said edge surfaces; and
    covering said non-concrete material and said bed with a second concrete having stretchable fibers mixed therein, wherein each cubic yard of said second concrete has 3-65 pounds of said stretchable fibers mixed therein.

3. A method according to claim 2, wherein each of said non-shrinkage cracks is V-shaped in cross-section.

4. A method according to claim 2, wherein said step of applying a force occurs all around a perimeter region of said bed.

5. A method according to claim 2, wherein said stretchable fibers are selected from the group consisting of polymer fibers and metal fibers.

6. A method according to claim 2, wherein said non-concrete material comprises at least one layer of a polymer material.

7. A method according to claim 2, wherein said first concrete comprises a non-fibrous concrete.

8. A method of fabricating a concrete slab system, comprising the steps of:
    placing a bed of a first concrete in a plastic state on a base, said bed having a top surface, a bottom surface, and edge surfaces;
    exposing said bed to a drying environment wherein said first concrete in said plastic state cures to thereby cause said top surface to develop shrinkage cracks and cause portions of said bed to separate from said base;
    applying, after said step of exposing, a force to said top surface at said portions of said bed to induce non-shrinkage cracks in said bed wherein widths of said non-shrinkage cracks are greater than widths of said shrinkage cracks, said non-shrinkage cracks extending to said bottom surface to thereby generate broken regions of said bed at said portions thereof wherein said bottom surface at said broken regions is in contact with said base;
    placing non-concrete material on said top surface and on each of said edge surfaces; and
    covering said non-concrete material and said bed with a second concrete in a plastic state, said second concrete having stretchable fibers mixed therein, wherein said non-concrete material reduces friction between said bed and said second concrete and prevents bonding between said bed and said second concrete.

9. A method of fabricating a concrete slab system, comprising the steps of:
    placing a bed of a first concrete in a plastic state on a base, said bed having a top surface, a bottom surface, and edge surfaces;
    exposing said bed to a drying environment wherein said first concrete in said plastic state cures to thereby cause said top surface to develop shrinkage cracks and cause portions of said bed to separate from said base;

applying, after said step of exposing, a force to said top surface at said portions of said bed to induce non-shrinkage cracks in said bed wherein widths of said non-shrinkage cracks are greater than widths of said shrinkage cracks, said non-shrinkage cracks extending to said bottom surface to thereby generate broken regions of said bed at said portions thereof wherein said bottom surface at said broken regions is in contact with said base;

placing non-concrete material on said top surface and on each of said edge surfaces; and covering said non-concrete material and said bed with a second concrete in a plastic state, said second concrete having stretchable fibers mixed therein, wherein each cubic yard of said second concrete has 3-65 pounds of said stretchable fibers mixed therein.

10. A method according to claim 9, wherein each of said non-shrinkage cracks is V-shaped in cross-section.

11. A method according to claim 9, wherein said step of applying a force occurs all around a perimeter region of said bed.

12. A method according to claim 9, wherein said stretchable fibers are selected from the group consisting of polymer fibers and metal fibers.

13. A method according to claim 9, wherein said non-concrete material comprises at least one layer of a polymer material.

14. A method according to claim 9, wherein said first concrete comprises a non-fibrous concrete.

15. A method of fabricating a concrete slab system, comprising the steps of:

placing a bed of a first concrete in a plastic state on a base, said bed having a top surface, a bottom surface in contact with said base, and edge surfaces;

exposing said bed to a drying environment wherein said first concrete in said plastic state cures to thereby cause said top surface to develop shrinkage cracks and cause portions of said bed to curl away from said base, wherein said bottom surface associated with each of said portions of said bed is spaced apart from said base;

applying, after said step of exposing, a force to said top surface at said portions of said bed to induce non-shrinkage cracks in said bed wherein widths of said non-shrinkage cracks are greater than widths of said shrinkage cracks, said non-shrinkage cracks extending to said bottom surface thereby breaking said portions of said bed from said bed wherein said bottom surface associated with each of said portions of said bed is in contact with said base;

placing non-concrete material on said top surface and on each of said edge surfaces; and covering said non-concrete material and said bed with a second concrete in a plastic state, said second concrete having stretchable fibers mixed therein, wherein said non-concrete material reduces friction between said bed and said second concrete and prevents bonding between said bed and said second concrete.

16. A method of fabricating a concrete slab system, comprising the steps of:

placing a bed of a first concrete in a plastic state on a base, said bed having a top surface, a bottom surface in contact with said base, and edge surfaces;

exposing said bed to a drying environment wherein said first concrete in said plastic state cures to thereby cause said top surface to develop shrinkage cracks and cause portions of said bed to curl away from said base, wherein said bottom surface associated with each of said portions of said bed is spaced apart from said base;

applying, after said step of exposing, a force to said top surface at said portions of said bed to induce non-shrinkage cracks in said bed wherein widths of said non-shrinkage cracks are greater than widths of said shrinkage cracks, said non-shrinkage cracks extending to said bottom surface thereby breaking said portions of said bed from said bed wherein said bottom surface associated with each of said portions of said bed is in contact with said base;

placing non-concrete material on said top surface and on each of said edge surfaces; and covering said non-concrete material and said bed with a second concrete in a plastic state, said second concrete having stretchable fibers mixed therein, wherein each cubic yard of said second concrete has 3-65 pounds of said stretchable fibers mixed therein.

17. A method according to claim 16, wherein each of said non-shrinkage cracks is V-shaped in cross-section.

18. A method according to claim 16, wherein said step of applying a force occurs all around a perimeter region of said bed.

19. A method according to claim 16, wherein said stretchable fibers are selected from the group consisting of polymer fibers and metal fibers.

20. A method according to claim 16, wherein said non-concrete material comprises at least one layer of a polymer material.

21. A method according to claim 16, wherein said first concrete comprises a non-fibrous concrete.

22. A method according to claim 1, wherein said non-concrete material comprises at least two layers of a polymer material.

23. A method according to claim 8, wherein said non-concrete material comprises at least two layers of a polymer material.

24. A method according to claim 15, wherein said non-concrete material comprises at least two layers of a polymer material.

* * * * *